United States Patent

[11] 3,626,800

| [72] | Inventors | Charles G. Newton, Jr.<br>Beverly;<br>Daniel Appleton, Topsfield; Milton R.<br>Radcliffe, Marblehead; William Tabroff,<br>Peabody, all of Mass. |
|---|---|---|
| [21] | Appl. No. | 883,460 |
| [22] | Filed | Dec. 10, 1969 |
| [45] | Patented | Dec. 14, 1971 |
| [73] | Assignee | USM Corporation<br>Boston, Mass. |

[54] CONDUCTIVE CUTTING PAD
8 Claims, 5 Drawing Figs.

[52] U.S. Cl. ............................................. 83/658,
83/537
[51] Int. Cl. ............................................. B26d 7/20

[50] Field of Search............................................. 83/658,
659, 537, 533, 698

[56] References Cited
UNITED STATES PATENTS

| 3,166,968 | 1/1965 | Krouskop ..................... | 83/698 |
| 3,167,990 | 2/1965 | Gilmartin ..................... | 83/658 |
| 3,343,437 | 9/1967 | Oster........................... | 83/658 X |
| 3,446,107 | 5/1969 | Moyer.......................... | 83/658 |

*Primary Examiner*—James M. Meister
*Attorneys*—Richard A. Wise, Richard B. Megley and Cornelius A. Cleary

ABSTRACT: A conductive cutting pad of solid polyurethane cast about a soft metal, cellular structure so that cell walls of the structure extend between cutting surfaces on the pad.

Patented Dec. 14, 1971  3,626,800

Inventors
Charles G. Newton, Jr.
Daniel Appleton
Milton R. Radcliffe
William Tabroff
By their Attorney
Cornelius A. Cleary

CONDUCTIVE CUTTING PAD

The present invention relates to cutting pads and more specifically electrically conductive cutting pads for cutting presses.

Cutting presses are extensively used for cutting blanks or shaped pieces from sheet materials such as paper, leather, piece goods, etc. produced from various natural and synthetic materials. Simply described those presses constitute a cutting bed and a beam or platen mounted on a spindle, capable of movement over the cutting bed as well as to and away from the cutting bed in order to force a freely movable cutting die or dies through the sheet material or work located on the bed. The cutting bed carries, supports or includes a cutting pad, now generally rubber, which is compounded to be sufficiently rigid as to resist general deformation from pressure applied by the platen, and, at the same time be penetrable by the cutting dies to the extent that the dies can be forced through the sheet material and into the pad that short distance which serves to insure complete cutting or cutting through sheet material or work by the die or dies. The latter is a matter of compounding the rubber so that it retains a certain degree of flexibility and resilience.

A major difficulty met with cutting presses involves adjustment of the cutting stroke of the platen. The stroke should be sufficiently long to force the die completely through the sheet material but not so long as to have the dies penetrate the pad to the extent that they become stuck in the pad. Similarly and of more practical concern, repeated heavy striking of the pad by the die or dies caused by too long a stroke, leads to roughing and scoring of a cutting surface of the cutting pad. Cutting surfaces which are unduly roughened or scored lead to less complete cutting by the dies about the periphery of the blank or piece being cut from the sheet material. As a result more frequent dressing of the cutting surface is necessitated, with its attendant costs and inconveniences.

To overcome that difficulty and provide a convenient means by which to regulate stroke length, conductive cutting pads and cutting presses for utilizing those pads have been devised. One such press is described in U.S. Pat. No. 2,788,070. In that press an electrical control circuit carried through the platen, die and conductive cutting pad operates to move the platen away, back or up from the cutting pad when the die is forced into contact with the cutting pad.

Conductive cutting pads have been constructed in different forms. Actually two different types have generally been used. Each suffers shortcomings. The first is the composition type of pad made from a rubber composition which includes a relatively heavy loading of finely divided electrically conductive material which may be a metal but is usually carbon black. An example of such a pad is described in U.S. Pat. No. 2,912,388. One shortcoming of that type of pad is the necessity to compound it with a high degree of care so that the pad has the necessary strength and toughness in addition to having the conductive material, which, is as indicated used in large amount, uniformly dispersed or distributed throughout the finished pad. Another shortcoming of that type of pad is that it is impossible to prevent some cutting and dusting of the rubber carbon black material at the cutting surface by the dies. That, due to the intense black color and coloring capacity of the material, can bring about staining or soiling of the work being cut, particularly where the work is light colored. The second type of conductive pad is what may be described as constituted or a multiplicity of planks, strips, etc. which are laminated together in alternating relationship, dielectric rubber and conductive soft metal. Examples of that type of pad are described in U.S. Pat. No. 3,167,990. In addition to staining possibilities, that type of pad also has shortcomings so far as achieving adhesion between the strips, sufficiently strong to withstand the heavy and repeated stresses of the cutting operation. Then too, because of the physical differences between aluminum and rubber wearing away of the cutting surface caused by repeated striking by the dies is generally uneven and in the form of ridges and hollows. Allowed to remain, that interferes with obtaining complete cutting and as a consequence frequent dressing of the cutting surface becomes a necessity. In that situation too, proper dressing is more difficult to obtain because of the laminate structure assembled from alternate planks of rubber and aluminum.

Accordingly, it is a principal object of the present invention to provide an improved conductive cutting pad.

It is another object to provide a conductive cutting pad exhibiting increased resistance to being cut, roughened, scored or ridged by cutting dies at its cutting surface.

It is another object to provide a conductive cutting pad exhibiting increased cutting life and requiring less frequent dressings during same while nevertheless retaining a cutting surface conducive to complete cutting of work by the cutting dies.

It is another object to provide a conductive cutting pad which causes less staining of work or sheet materials, and particularly those of light coloration cut on the same.

Those and other objects of this invention are obtained in an electrically conductive cutting pad defined by a pair of cutting surfaces. The subject pad constitutes a cast mass of solid polyurethane and includes a metal structure or grid made up of interconnected wall members extending between the cutting surfaces and defining a multiplicity of cell structures filled with the polyurethane.

The following drawings are included for the purpose of illustrating the invention in which.

Reference is now made to the drawings.

Figure 1:
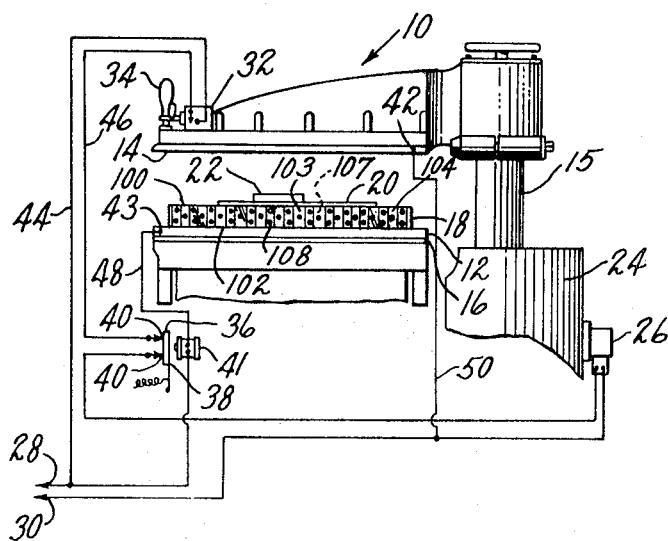
FIG. 1 is a partial, diagrammatic, side elevation of a cutting press carrying a conductive cutting pad and cutting die.

FIG. 1 illustrates, in somewhat diagrammatic manner, a cutting press 10, including an electrically conductive bed 12, a platen 14, and a dielectric insulating sheet 16. The platen 14 is carried on upright spindle 15. The conductive bed 12 is shown carrying a cutting pad 18 on which is located the work, sheet material 20 which is to be cut out to a shape defined by die 22 as registered on sheet 20. Cutting of sheet 20 by die 22 is effected by moving plate 14 toward the work by, for example, hydraulically operated means, not shown, housed within casing 24, which is controlled through electrically operated valve 26. The normal condition of valve 26 is such that platen 14 is up or back from the work 20. Valve 26 is connected into power lines 28 and 30 in series with a normally open switch 32 which is closed upon a downward push of spring-loaded handle 34. Also, in that circuit is switch means 36 including a spring-loaded armature 38 in contact with fixed contact points 40. A cooperating electromagnet 41 is connected into power lines 28 and 30 in series with the switch 32 with terminals 42 on platen 14 and contact 43 on bed 12. When cutting die 22 is forced through work 20 and makes contact with cutting pad 18, switch 32 closes, the electromagnet 41 is activated causing armature 38 to move away from contact points 40 and open switch 36, which in turn operates valve 26 to cause platen 14 to raise or back away from work 20 to its normal rest position.

In operating the cutting press 10, a sheet 20 which is to be cut is placed on the cutting pad 18. Then, the die 22 or dies 22 are located on sheet 20. The operator pushes handle 34 downwardly to close switch 32, causing current to flow from the power terminal, not shown, through line 44, the closed switch 32, and then through line 46 and power line 28 to another terminal, not shown. Platen 14 comes down and presses die 22 downwardly into and through sheet 20, until it, die 22, makes contact with the conductive cutting pad 18. With that, the circuit is completed through pad 18. As a result current from the terminal, not shown, through connector 28, the electromagnet 41, connector 48, conductive cutting pad 18, die 22 and platen 14 and closed switch 32. From there it passes through connector 50 and power line 30 to the terminal, not shown. That serves to actuate electromagnet 41 causing switch 30 to open cutting off the power to valve 26, and raising platen 14.

Figure 2:
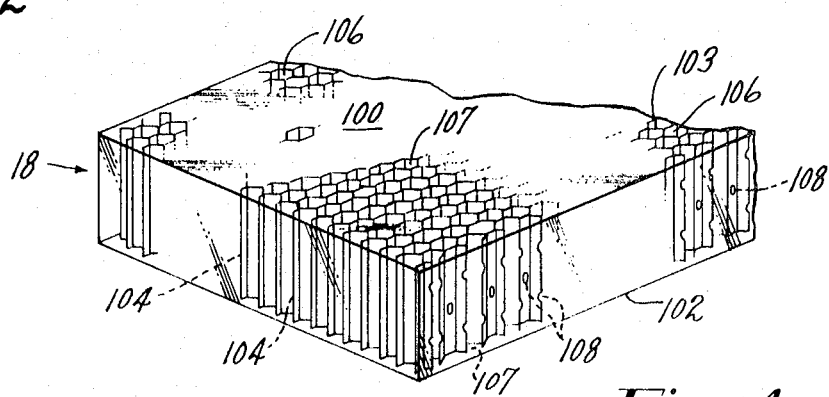
FIG. 2 is a partial, perspective view of one embodiment of the cutting pad of this invention.
Figure 3:
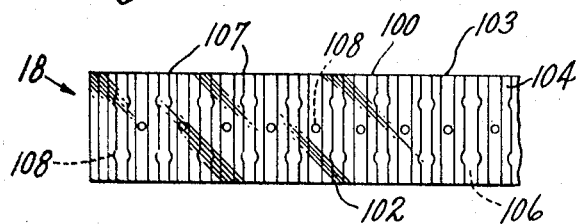
FIG. 3 is a partial, side elevation of the embodiment of the cutting pad corresponding to that shown in FIG. 2.

A first embodiment of cutting pad 18 corresponding to that shown in FIG. 1 is shown with greater specificity in FIGS. 2 and 3. The cutting pad 18 is disposed between a pair of cutting surfaces 100 and 102, only one of which is used in any given cutting operation. The cutting surfaces 100 and 102 which are essentially parallel and opposite one another are interchangeable and simply by tipping pad 18 over one of those surfaces may be made to replace the other. The pad constitutes a cast mass of polyurethane material including a soft metal structure 103, the latter shown in the form of a honeycomb structure, made up of a number of interconnecting walls 104. Walls 104 extend between the cutting surfaces 100 and 102. The interconnecting walls 104 are disposed with respect to one another so as to define a multitude or multiplicity of cells 106 filled with cast polyurethane 107. Walls 104 are shown provided with intercommunicating openings 108 allowing the polyurethane mass in each of the individual cells 106 to be component parts of an overall continuous mass of polyurethane making up or throughout pad 18. This preferred embodiment serves to contribute greater strength, dimensional stability as well as adhesive strength between the metal internal structure through its walls 104 and the polyurethane 107 filling cells 106, and throughout the entire polyurethane mass as a result. As a further result, the pad 18 shows additional extended life, in maintenance of good, even, cutting surfaces 100 and 102, with extended use. Also there is added resistance to wear, roughing, etc. by the dies 22 as well as more even or less irregular cutting away or roughing, gouging, etc. of those surfaces by dies 22. It is also preferred that the polyurethane be cast to a clear or light color to further minimize staining of work, particularly light colored work. This is in addition to the improvement in nonstaining which is obtained from the utilization of cast polyurethane in producing the conductive pad of the present invention. This latter has reference to the outstanding abrasion resistance, and minimum dusting resulting on repeated cutting, characteristic of the cast polyurethane.

Figure 4:
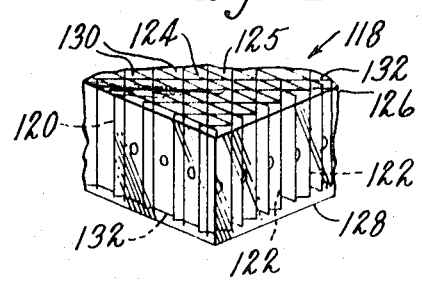
FIG. 4 is a partial perspective view of another embodiment of the cutting pad of this invention.

The embodiment shown in FIG. 4 is directed to a conductive cutting pad 118 in which the soft metal structure or grid 120 is constituted of connecting or interconnecting walls 122 as to form triangular shaped cells 124 which serve to include cast polyurethane 125. This particular configuration of structure 120 is more resistant to deformation during pouring of the polyurethane in liquid form, into a mold in which the structure is located, at the start of the casting operation. As a result, the individual walls 122 may be made of relatively thinner metal stock, and still maintain their given location and shape to provide cutting surfaces 126 and 128 with cell openings 130 of even distribution, that is the wall edges 132 retain their geometric shape, and the electrical conductivity of the pad remains distributed as predetermined.

Figure 5:
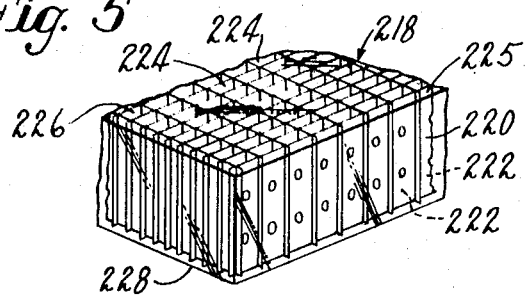
FIG. 5 is a partial perspective view of still another embodiment of the cutting pad of this invention.

The embodiment shown in FIG. 5 is directed to a conductive cutting pad 218 in which the soft metal structure or grid 220 preferably of aluminum, is constituted of connecting or interconnecting walls 222, as to form or define rectangular shaped cells 224 filled with cast polyurethane 225 extending between cutting surfaces 226 and 228. This construction is intermediate in resistance to deformation by pouring of the polyurethane in liquid, reactable form, between the embodiment shown in FIG. 4 and that shown in FIGS. 1-3. The subject embodiment has advantages from the standpoint of convenience or ease of production of the metal structure 220, as such. Other metal structures having wall disposition characteristics other than those shown are also intended for use in producing the conductive pads of the present invention, provided that the structure is made up of walls that are interconnected, extend between cutting surfaces of the pad, and define a multiplicity of cells which in the final pad product are filled with solid polyurethane as a result of casting in a molding site.

The polyurethanes for use in producing the conductive cutting pad of the present invention are those which may be conveniently cast into solid shapes exhibiting relatively low shrinkage coefficients and a high degree of resistance to being cut by the cutting dies that is abrasion resistance. They should also have sufficient resilience as not to be chipped, cracked or broken by repeated impacts made by the dies. Polyurethanes having hardnesses in Shore durometer D scale of 60 to 95 with a more preferred range of 70 to 85 are recommended. Polyurethanes which perform in that manner are those which are reaction products of polyols or polyamines with polyisocyanates. The polyols may be diols, triols, tetrols or mixtures of the same having functional (amine $NH_r$ or hydroxyl OH) equivalent weights of 30 to 700 and preferably 75 to 350. Hydroxyl equivalent weights are calculated on the weight of the polyol against the equivalent weight of the hydroxyl radical, for example, the number of grams of polyol required so that one equivalent weight (17.008 grams) of available hydroxyl are present in the same mass. The amine equivalent weight is similarly calculated.

Polyols which may be used include glycols, glycerols, polyethers and polyesters having available hydroxyl functionality as indicated. Examples include ethylene glycol, propylene glycol, butane diol, glycerol, pentaerythritol, trimethylol propane; 1, 2, 6-hexane triol and the ethoxylated and propoxylated derivatives of glycols, glycerol, etc.; also polyethylene oxide, polypropylene oxide, polytetramethylene oxide, propoxylated derivatives of sucrose, sorbitols, etc.; also hydroxyl terminated esters and polyesters obtained from reaction between polybasic acids and polyhydric alcohols such as glycols, glycerols, etc.; polyamines such as dianisidine, paraphenylene diamine, methylene bis (2-methoxy aniline), methylene bis(o-chloro aniline); etc. and mixtures of the preceding.

The hydroxyl and/or amine terminated compositions are reacted with a polyisocyanate to produce the desired polyurethane, the latter term intended as including polyureas. Polyisocyanates which may be used include 2,4 toluene diisocyanate, m-phenylene diisocyanate, 4,4 biphenylene diisocyanate, 1,6 hexamethylene diisocyanate, diphenylmethane 4,4'-diisocyanate, polymethylene polyphenylisocyanate, etc.

In reacting the hydroxyl and/or amine terminated compositions with the polyisocyanate essentially stoichiometric amounts are used based on functional groups of each (Zerewitinoff test). This may range ±5 percent by weight. Catalysts may be used to activate the reaction between the isocyanate and active hydrogen containing compositions. Examples of catalysts which are used in minor amounts include various organotin compounds, such as stannous octoate, stannous oleate, dibutyl tin diacetate, dibutyl tin dilaurate, etc., organomercury compounds such as phenyl mercuric propionate, etc. Various adjuncts may also be included in the reactant mass such as surfactants, etc., fillers, preferably white or light colored, etc.

The metal cellular structure which is included as the electrically conductive member in the cutting pad may be produced from a number of relatively soft metals or metal alloys. These may include aluminum, which is preferred, as well as titanium; lead, tin and ferrous alloys, copper, silver, zinc, etc. The thickness of the structure walls as well as sizes of the cell openings formed by or between the walls, that is the distances from wall to wall, may be varied based on the conductivity of the particular metal or alloy chosen. When an aluminum structure having a wall thickness of 0.005 inch is used to produce a pad 1.0 inch in cutting thickness the cells may range between 0.125 to 2.00 inch in opening, or diameter.

In order to facilitate adhesion between the cast polyurethane and the metal structure it may be desirable to use a primer or coupling agent, which is applied to the metal structure as a preliminary to the casting operation. Organofunctional silane compositions work well in this regard. The amounts used may be very small, with the silane provided so that dipping, spraying or other convenient application procedure may be practiced. Silanes which may be used to advantage include amyltriethoxy silane, ethyltriethoxy silane, phenyltrichlorosilane, vinyltriacetoxy silane, etc.

The casting operation, for producing the cutting pad, is carried out incidental to reacting or advancing the reaction of the active hydrogen containing composition with the polyisocyanate to produce the polyurethane in final solid state. A convenient casting or molding site is chosen. Preferably the mixing and molding sites used should be such that they may be exhausted or pumped out by vacuum or other pumping expedient, to minimize entrapment of bubbles or voids from moisture, air, carbon dioxide or accumulation of other gaseous products in the cast pad. Preliminary to casting the metal structure, honeycomb or the like which may have been primed, as indicated previously, is located in the mold.

The reactants, active hydrogen containing composition, polyisocyanate, catalyst, if the latter is used, etc. are mixed together using convenient mixing means and procedure and preferably under exhaust conditions. Reaction may be forestalled by mixing under low temperature, or it may be allowed to initiate, but under any circumstance the reactant mixture is poured into the mold while still in a fluid or liquid state. With the reaction initiated, exhaust conditions are preferably maintained. After filling the mold, the reaction is allowed to continue to produce a solid polyurethane elastomer. Elevated temperatures may be used to shorten the reaction and incidental casting times.

Thereafter, the cast pad is removed from the mold and is dressed to provide it with even and preferably, essentially parallel cutting surfaces.

The following examples are included for the purpose of illustrating the invention.

EXAMPLE I

A metered mixer is charged with 12.5 pounds of polyethylene adipate (OH Eq. Wt. 250) and 8.8 pounds of ethoxylated trimethylolpropane (OH Eq. Wt. 88) and 6.5 grams of phenyl mercuric propionate. After thorough mixing and dehydrating of the above, 21.6 pounds of toluene diisocyanate adduct of dipropylene glycol (NCO Eq. Wt. 144) are charged in at a rate of 30 pounds per minute and discharged continuously into the casting site.

The casting site includes an open top rectangular mold having 20×40×1.0 inch dimensions located in an oven provided with a vacuum pump. Previous to casting an aluminum honeycomb 20×40 inches made up of hexagonal cells, having 0.75 inch cell size and 1.0 inch wall length is positioned in the mold. The honeycomb in turn has been previously primed with a 10 percent alcohol-water solution of ethyltrioxy silane and dried.

Discharging of the reactive mass into the mold is followed by activation of the pump, and oven heating at 100° C. The casting period is set at 30 minutes. Pumping is continued throughout that period.

Thereafter the mold is removed from the oven and the cast pad then removed from the mold and allowed to cool. Shore D harness for the pad is established as 73 at 72° C.

The pad is then dressed at both flat surfaces to bring them into essentially parallel relationship and insure that the wall ends of the aluminum honeycomb are exposed at both cutting surfaces.

The cutting pad is then cycled for a period of 14 days in a USM Hytronic Cutting Press—Model B fitted with a 4-inch circular die of operable sharpness sufficient to cut side leather. The die is maintained in a location 8 inches in diameter on the cutting surface, and is moved after each stroke. Only a single cutting surface on the pad is exposed to the die over the entire period. It is calculated that during that time the die struck the pad about 100,000 times. At the end of that period it is noted that little wear, and, that uniform in nature, takes place on the cutting surface of the pad. The wear is such that it does not require dressing of the cutting surface in order to continue with good and complete cutting at the same.

EXAMPLE II

The procedure set forth in the previous example is essentially followed again. First, 26 pounds of polypropylene oxide diol (OH Eq. Wt. 390), 5.1 pounds of trimethylolpropane (OH Eq. Wt. 46) and 4.0 grams of phenyl mercuric propionate are mixed for 30 minutes at 90° C. and are then cooled to room temperature. Thereafter 25.1 pounds of toluene diisocyanate adduct of dipropylene glycol (NCO Eq. Wt. 144) are added, reacted and cast in the manner previously described.

The cast pad obtained has a Shore D hardness of 73 at 72° C. It is dressed and tested in the Hytronic Cutter to the extent previously described. Performance re wearing is slightly less than the pad described in example I, but again has not arrived at the point where dressing is necessary after the 14-day testing period is completed.

EXAMPLE III

The procedure set forth in the two preceding examples is again essentially followed to produce a cutting pad. The reactants uses are 26 pounds of polypropylene oxide diol (OH Eq. Wt. 390), 11.3 pounds of methylene bis(o-chloro aniline) (NH Eq. Wt. 133.5), 4.0 grams of dibutyl tin dilaurate and 21.9 pounds of toluene diisocyanate adduct of dipropylene glycol (NCO Eq. Wt. 144). The pad obtained has a Shore D hardness of 73 at 72° C. The wearing performance of the pad is essentially that of the pad described in example I.

It will thus be seen that the objects set forth above, among those made apparent from the preceding description, are efficiently attained and, since certain changes may be made in the above conductive cutting pad without departing from the scope of the invention, it is intended that all matter contained in the above description or shown in the accompanying drawings shall be interpreted as illustrative and not in a limiting sense.

Having thus described our invention what we claim as new and desire to secure by Letters Patent of the United States is:

1. An electrically conductive cutting pad exhibiting increased cutting life, resistance to staining work cut on the said pad and providing uniform distribution of electrical conductivity, comprising a cast mass of light colored solid polyurethane defining a pair of opposing cutting surfaces, and a honeycomb structure of relatively soft metal comprising interconnecting wall members extending between the cutting surfaces, the wall members forming a multiplicity of evenly distributed cell structures of substantially uniform, repeating, geometrical shape open to said surfaces and filled with the polyurethane having a Shore durometer hardness in the range of 60 to 95 on the D Scale.

2. An electrically conductive cutting pad according to claim 1 wherein the polyurethane has a Shore durometer hardness in the range of 70 to 85 on the D scale.

3. An electrically conductive cutting pad according to claim 1 wherein the wall members have intercommunicating holes located in the same a uniform distance from said faces for receiving the polyurethane.

4. An electrically conductive cutting pad according to claim 1 wherein the wall members form cell structures which are hexagonal in cross section.

5. An electrically conductive cutting pad according to claim 1 wherein the wall members form cell structures which are triangular in cross section.

6. An electrically conductive cutting pad according to claim 1 wherein the wall members form cell structures which are rectangular in cross section.

7. An electrically conductive cutting pad according to claim 1 wherein the wall members are aluminum.

8. An electrically conductive cutting pad according to claim 1 wherein the cell structures range between about 0.125 and 2.00 inches in diameter.

* * * * *